United States Patent
Yamashita et al.

(10) Patent No.: US 6,786,452 B2
(45) Date of Patent: Sep. 7, 2004

(54) WING STRUCTURE OF AIRPLANE

(75) Inventors: Daiya Yamashita, Saitama (JP); Hiroshi Kato, Saitama (JP); Jun Nakazawa, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/601,650

(22) Filed: Jun. 24, 2003

(65) Prior Publication Data

US 2004/0056152 A1 Mar. 25, 2004

(30) Foreign Application Priority Data

Jun. 24, 2002 (JP) .................................. 2002-182573

(51) Int. Cl.⁷ .............................. B64C 3/18; B64C 1/00
(52) U.S. Cl. ...................... 244/123; 244/124; 244/131; 244/132; 244/117 R; 244/119
(58) Field of Search ............................... 244/119, 120, 244/123–124, 117 R; 52/653.1, 650.1, 252, 782.1, 729.2, 790.1; 29/897.2

(56) References Cited

U.S. PATENT DOCUMENTS

| | | | | |
|---|---|---|---|---|
| 1,348,374 A | * | 8/1920 | Plym | 244/123 |
| 2,233,969 A | * | 3/1941 | Woods | 244/123 |
| 2,567,124 A | * | 9/1951 | Roberts | 244/124 |
| 4,113,910 A | * | 9/1978 | Loyd | 244/131 |
| 4,246,737 A | * | 1/1981 | Eiloart et al. | 52/729.2 |
| 4,331,495 A | * | 5/1982 | Lackman et al. | 244/132 |
| 4,356,616 A | * | 11/1982 | Scott | 29/897.2 |

* cited by examiner

Primary Examiner—Michael J. Carone
Assistant Examiner—L. Semunegus
(74) Attorney, Agent, or Firm—Birch, Stewart, Kolasch & Birch, LLP

(57) ABSTRACT

In a wing of an airplane, a front spar having a C-shape in section includes a web, flanges, and a reinforcing partition wall. An intermediate spar having an I-shape in section includes a web, flanges, and a reinforcing partition wall. Ribs can be positioned in a span direction by coupling front and rear portions of the ribs to the reinforcing partition wall of the front spar and the reinforcing partition wall of the intermediate spar, without the provision of an assembling jig having a positioning function and without the use of a special positioning member. In addition, the ribs can be positioned in a cord direction by bringing rear ends of the ribs into abutment against a front surface of the web of the intermediate spar. Thus, it is possible to assemble the wing of the airplane using an inexpensive assembling jig having no rib-positioning function.

19 Claims, 5 Drawing Sheets

WING STRUCTURE OF AIRPLANE

CROSS-REFERENCE TO RELATED APPLICATIONS

The present nonprovisional application claims priority under 35 USC 119 to Japanese Patent Application No. 2002-182573 filed on Jun. 24, 2002 the entire contents thereof is hereby incorporated by reference.

BACKGROUND OF THE INVENTION

1. Field of the Invention

The present invention relates to a wing structure in an airplane in which a plurality of ribs extending in a cord direction are coupled between a front first spar and a rear second spar extending in a span direction.

2. Description of the Related Art

A main wing of an airplane has a structure in which a plurality of ribs extending in a cord direction are fixed at predetermined intervals to a plurality of spars extending in a span direction, and surfaces and backs of the spars and the ribs are covered with a skin for the airplane. The positioning of the ribs in the span direction and the cord direction relative to the spars has been carried out using an expensive and special assembling jig. Such assembling jig is poor in general-purpose properties, and hence is required to be prepared for each wing type. This causes an increase in equipment cost for the assembling jig.

Therefore, if a rib-positioning function is eliminated from the assembling jig for the wing of the airplane, the cost of the assembling jig can be remarkably reduced.

SUMMARY AND OBJECTS OF THE INVENTION

Accordingly, it is an object of the present invention to enable an accurate assembling of a wing of an airplane by using an inexpensive assembling jig having no rib-assembling function.

To achieve the above object, according to a first feature of the present invention, there is provided a wing structure for an airplane in which a plurality of ribs extending in a cord direction are coupled between a front first spar and a rear second spar extending in a span direction, wherein each of the first and second spars is a C-shape or an I-shape in section, having a web and a pair of flanges connected to opposite ends of the web, and having a reinforcing partition wall connected to the web and the flanges. The ribs are positioned in the span direction by coupling front portions of the ribs to the reinforcing partition wall of the first spar and coupling rear portions of the ribs to the reinforcing partition wall to the second spar.

With the above arrangement, each of the first and second spars of the C-shape or I-shape in section has the web, the pair of flanges and the reinforcing partition wall connected to the web and the flanges. Therefore, the ribs can be positioned in the span direction by coupling the front portions of the ribs to the reinforcing partition walls of the first spar and coupling the rear portions of the ribs to the reinforcing partition walls of the second spar. The positioning of the ribs in the span direction is carried out utilizing the reinforcing partition walls mounted to enhance the rigidity of the first and second spars. Hence, a rib-positioning function can be omitted from an assembling jig, and an accurate assembling of the wing can be ensured without use of a special positioning member to reduce the cost.

According to a second feature of the present invention, in addition to the arrangement of the first feature, the ribs are positioned in the cord direction by bringing one of the front and rear ends of the ribs into abutment against the web of one of the first and second spars.

With the above arrangement, the ribs can be positioned in the cord direction, without the provision of a special positioning member, by bringing one of the front and rear ends of the ribs into abutment against the web of one of the first and second spars, thereby precisely assembling the wing.

According to a third feature of the present invention, in addition to the arrangement of the second feature, in order to bring one of the front and rear ends of said ribs into abutment against said web of one of said first and second spars, a shim is provided in a gap defined between the flange of the other of the first and second spars and each of the ribs.

With the above arrangement, the shim is provided in the gap defined between the flange of the other of the first and second spars and each of the ribs. Hence, the one of the front and rear ends of the ribs can be brought reliably into abutment against the web of one of the first and second spars, leading to a further enhancement in accuracy of positioning of the ribs in the cord direction.

In the embodiment described, a front spar 11 corresponds to the first spar of the present invention. An intermediate spar 12 corresponds to the second spar and a projection 24*b* corresponds to the shim of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described by way of a preferred embodiment with reference to the accompanying drawings.

Figure 1:
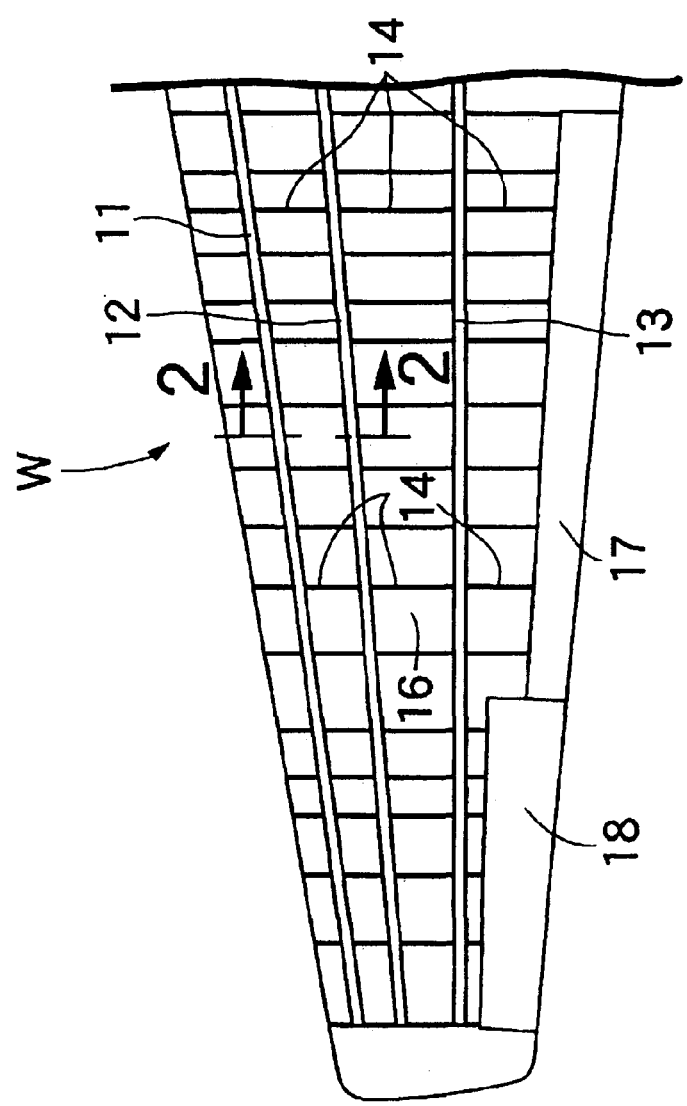
FIG. 1 is a plan view of a main wing of an airplane.

FIG. 1 shows a skeleton of a main wing W of an airplane in a state in which an upper skin has been removed. The main wing W includes a front spar 11, an intermediate spar 12 and a rear spar 13, which extend in a span direction. Upper and lower surfaces of the spars 11, 12 and 13 and a plurality of ribs 14 fixed to the spars and extending in a cord direction, are covered with an upper skin 15 (see FIGS. 2 to 5) and a lower skin 16. A flap 17 is mounted at a root of a trailing edge of the main wing W. An aileron 18 is mounted at a tip end of the training edge. The ribs 14 between the front spar 11 and the intermediate spar 12, the ribs 14 between the intermediate spar 12 and the rear spar 13 and the ribs 14 located in the rear of the rear spar 13 are separated as different members.

Figure 2:
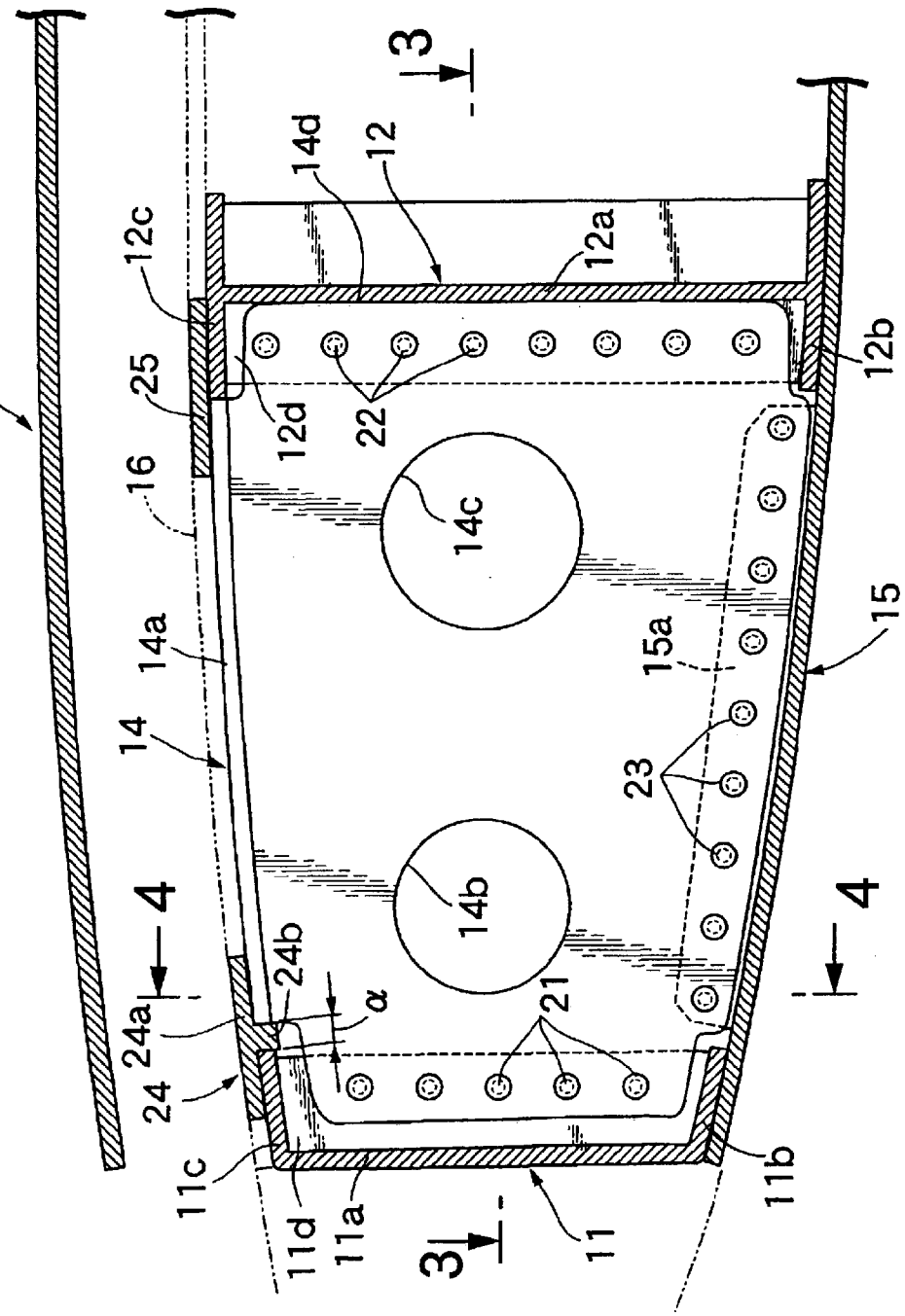
FIG. 2 is an enlarged sectional view taken along a line 2—2 in FIG. 1.
Figure 3:
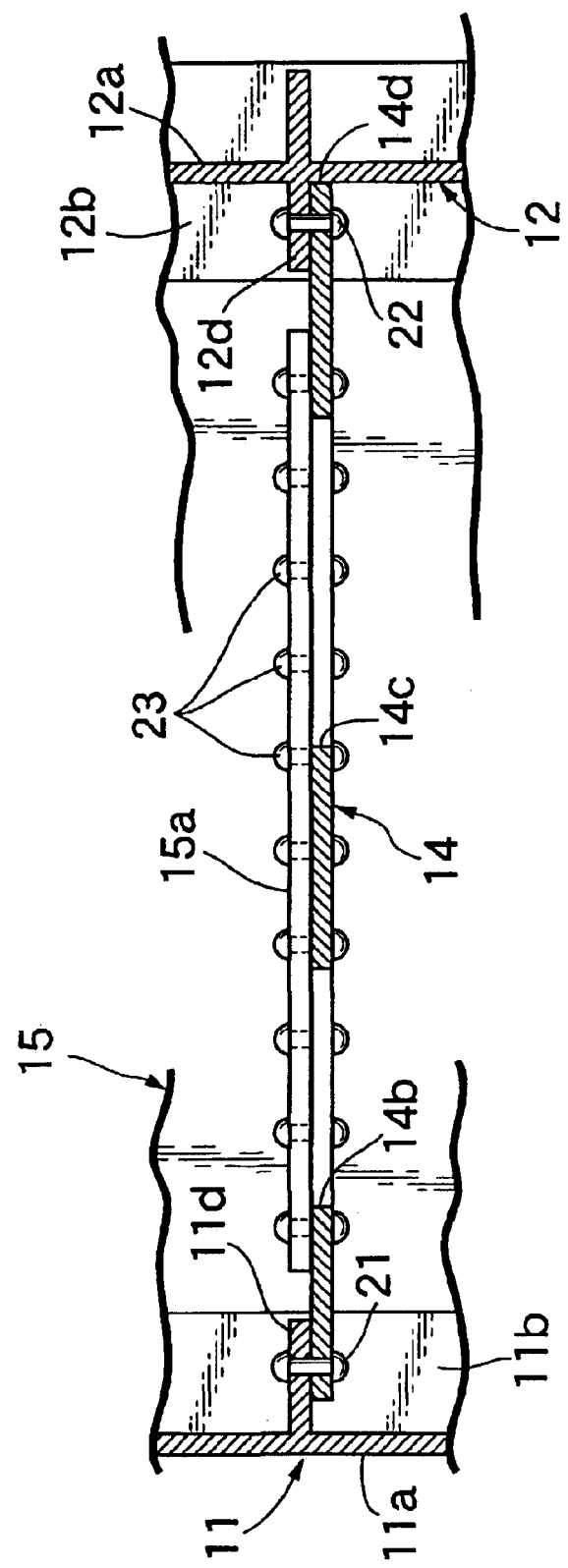
FIG. 3 is a sectional view taken along a line 3—3 in FIG. 2.
Figure 4:
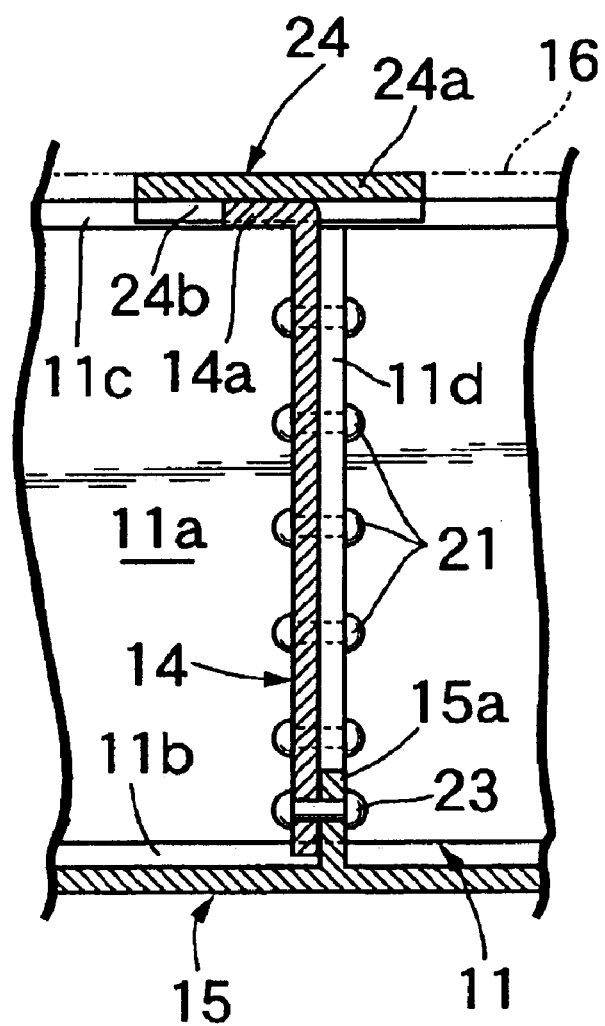
FIG. 4 is a sectional view taken along a line 4—4 in FIG. 2.
Figure 5:
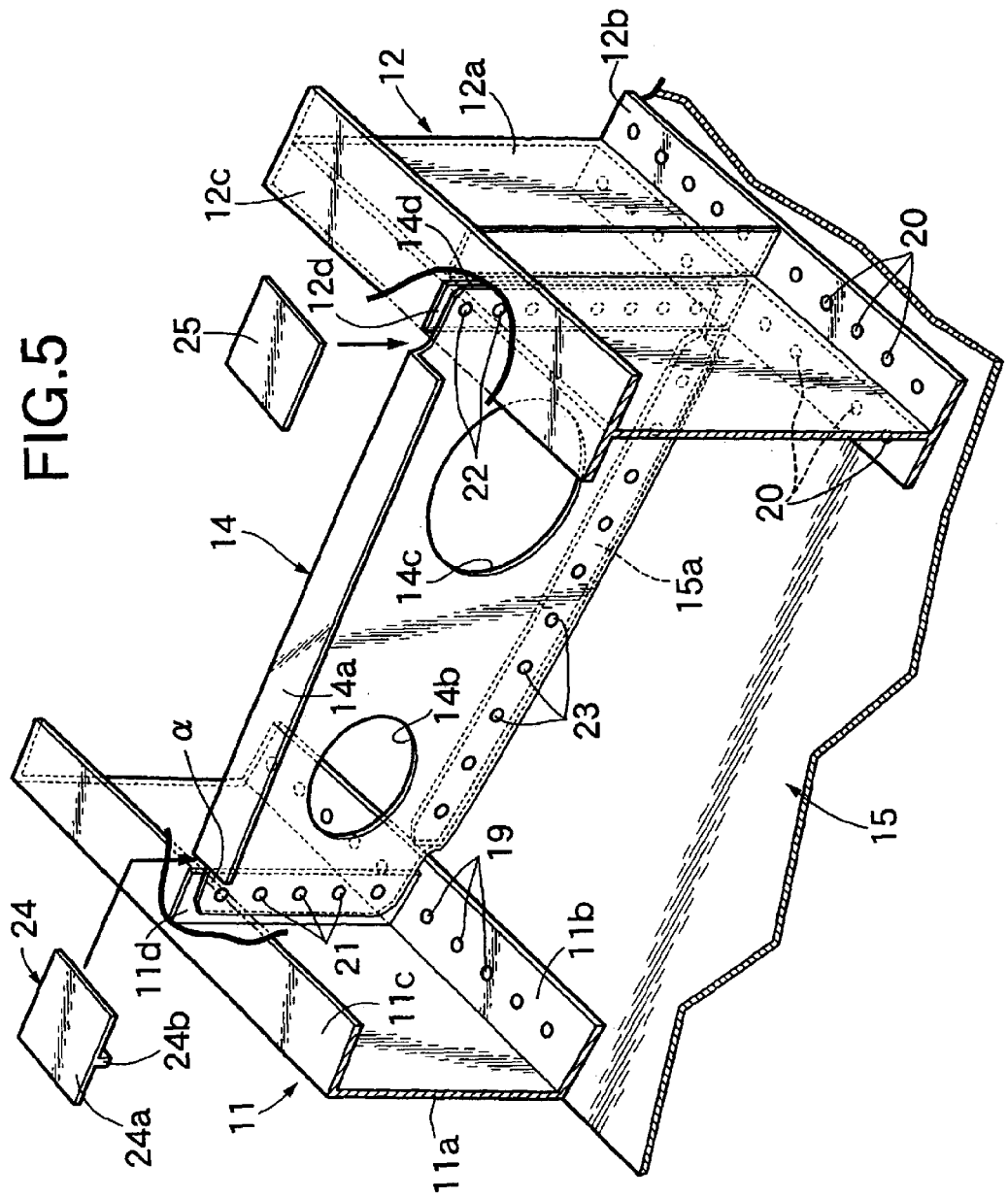
FIG. 5 is a perspective view similar to FIG. 2.

FIGS. 2 to 4 show the structure of the main wing in the process of assembling the main wing with upper and lower surfaces turned over (with the upper skin 15 being on a lower side) by using jigs (not shown).

The front spar 11 is a member having a C-shape in section and including a web 11a rising in a vertical direction and extending in the span direction. A flange 11b extends from an upper end (a lower end in the Figures) of the web 11a toward the trailing edge, and a flange 11c extends from a lower end (an upper end in the Figures) of the web 11a toward the trailing edge. A reinforcing partition wall 1d is integrally formed on the front spar 11 at a location surrounded from three directions by a rear surface of the web 11a and the upper and lower flanges 11b and 11c.

The intermediate spar 12 is a member having an I-shape in section including a web 12a rising in the vertical direction and extending in the span direction. A flange 12b extends from an upper end (a lower end in the Figures) of the web 12a toward a leading edge and the trailing edge, and a flange 12c extends from a lower end (an upper end in the Figures) of the web 12a toward the leading edge and the trailing edge. A reinforcing partition wall 12d is integrally formed on the intermediate spar 12 at a location surrounded from three directions by a front surface of the web 12a and the upper and lower flanges 12b and 12c.

The rib 14 connecting the front spar 11 and the intermediate spar 12 to each other is a plate-shaped member and includes a flange 14a formed by bending a lower surface (an upper surface in the Figures) of the plate-shaped member at a right angle, and two front and rear lightening bores 14b and 14c. A flange 15a is integrally formed on an inner surface (a lower surface in the Figures) of the upper skin 15 to extend in the cord direction.

The flange 11b of the front spar 11 is coupled to the upper skin 15 placed upside down on the jig (not shown) by rivets 19. The flange 12b of the intermediate spar 12 is coupled to the upper skin 15 by rivets 20. The rib 14 is coupled at its front portion to the reinforcing partition wall 1d of the front spar 11 by rivets 21, at its rear portion to the reinforcing partition wall 12d of the intermediate spar 12 by rivets 22 and at its upper edge (a lower edge in the Figures) to the flange 15a of the upper skin 15 by rivets 23. The positions of the reinforcing partition walls 1d and 12d in the span direction are accurately controlled by forming the front spar 11 and the intermediate spar 12 by NC machining. Therefore, it is possible to accurately position the rib 14 in the span direction, without use of a special jig and a special positioning member, by utilizing the reinforcing partition walls 11d and 12d which should be intrinsically used for enhancing the rigidity of the front spar 11 and the intermediate spar 12 and by coupling the rib 14 to the reinforcing partition walls 11d and 12d by the rivets 21 and 22. This can contribute to reductions in cost and number of assembling steps.

In addition, it is possible to position the rib 14 in the cord direction by bringing the rear end 14d of the rib 14 into abutment against the front surface of the web 12a of the intermediate spar 12 simultaneously with the positioning of the rib 14 in the span direction by the reinforcing partition walls 11d and 12d, and hence it is possible to ensure an assembling accuracy while omitting the function for positioning the rib 14 from a jig to reduce the cost.

When the rib 14 is positioned in the span direction and the cord direction in the above-described manner, a first positioning plate 24 which has a projection 24b having a function of a shim, is brought into abutment against the flange 11c of the front spar 11 and the front end of the flange 14a at a lower edge of the rib 14 to be clamped by a clamp (not shown). The first positioning plate 24 includes a plate-shaped portion 24a and the projection 24b protruding from a lower surface of the plate-shaped portion 24a. The rib 14 is vertically positioned by the abutment of the lower surface of the plate-shaped portion 24a against the flange 11c of the front spar 11 and the flange 14a of the rib 14, and at the same time, the projection 24b is fitted into the gap a (see FIGS. 2 and 5) between the rear end of the flange 11c of the front spar 11 and the front end of the flange 14a of the rib 14. The thickness of the projection 24b is accurately controlled, and the front end of the flange 14a of the rib 14 is urged rearwardly, so that the rear end 14d of the rib 14 is pushed against the front surface of the web 12a of the intermediate spar 12, whereby the positioning accuracy of the rib 14 in the cord direction can be further enhanced.

Additionally, the rib 14 can be vertically positioned by bringing a plate-shaped second positioning member 25 into abutment against the flange 12c of the intermediate spar 12 and the rear end of the flange 14a at the lower edge of the rib 14 to be clamped by a clamp (not shown).

When the rib 14 positioned in the above-described manner is coupled to the front spar 11, the intermediate spar 12 and the upper skin 15 by the rivets 21, 22 and 23, the first positioning plate 24 and the second positioning plate 25 are removed, and thereafter the lower skin 16 is coupled by rivets to the flange 11c of the front spar 11, the flange 12c of the intermediate spar 12, and the flange 14a of the rib 14.

Although the embodiments of the present invention have been described in detail, it will be understood that the present invention is not limited to the above-described embodiment, and various modifications in design may be made without departing from the spirit and scope of the invention defined in the claims.

For example, in the embodiment, the rear end 14d of the rib 14 is brought into abutment against the front surface of the web 12a of the intermediate spar 12 in order to position the rib 14 in the cord direction, but the front end of the rib 14 may be brought into abutment against the rear surface of the web 11a of the front spar 11.

The front spar 11 may be of an I-shape in section, and the intermediate spar 12 may be of a C-shape in section.

In addition, although the positioning of the rib 14 between the front spar 11 and the intermediate spar 12 has been described in the embodiment, the present invention is applicable to the positioning of the rib 14 between the intermediate spar 12 and the rear spar 13.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wing structure for use with an airplane comprising:

a first spar;

a second spar;

a plurality of ribs extending in a cord direction, each rib being coupled between said first spar and said second spar extending in a span direction;

wherein said first spar is of a C-shape and said second spar is of an I-shape in section, each of said first and second spars having a web, a pair of flanges connected to opposite ends of said web and a reinforcing partition wall connected to said web and said flanges; and wherein said ribs are positioned in the span direction by coupling front portions of said ribs to said reinforcing partition wall of said first spar and coupling rear portions of said ribs to said reinforcing partition wall of said second spar.

2. The wing structure for use with an airplane according to claim 1, wherein said ribs are positioned in the cord direction by bringing one of the front and rear ends of said ribs into abutment against said web of one of said first and second spars.

3. The wing structure for use with an airplane according to claim 2, wherein, in order to bring one of the front and rear ends of said ribs into abutment against said web of one of said first and second spars, a shim is provided in a gap defined between said flange of the other of said first and second spars and each of said ribs.

4. The wing structure for use with an airplane according to claim 3, wherein said shim is formed by a first positioning plate that includes a projection extending downwardly therefrom.

5. The wing structure for use with an airplane according to claim 2, wherein said ribs include a first flange extending along a length of the ribs in the cord direction of the ribs.

6. The wing structure for use with an airplane according to claim 1, wherein said first spar is a front spar and the second spar is an intermediate spar.

7. The wing structure for use with an airplane according to claim 1, wherein said first spar is an intermediate spar and the second spar is a rear spar.

8. The wing structure for use with an airplane according to claim 5, wherein said ribs include a second flange extending along a length of the ribs and being displaced relative to the first flange in the cord direction of the ribs.

9. A wing structure for use with an airplane comprising:

a first spar;

a second spar;

a plurality of ribs extending in a cord direction, each rib being coupled between said first spar and said second spar extending in a span direction;

wherein said first spar is of an I-shape and said second spar is of a C-shape in section, each of said first and second spars having a web, a pair of flanges connected to opposite ends of said web and a reinforcing partition wall connected to said web and said flanges; and wherein said ribs are positioned in the span direction by coupling front portions of said ribs to said reinforcing partition wall of said first spar and coupling rear portions of said ribs to said reinforcing partition wall of said second spar.

10. The wing structure for use with an airplane according to claim 9, wherein said ribs are positioned in the cord direction by bringing one of the front and rear ends of said ribs into abutment against said web of one of said first and second spars.

11. The wing structure for use with an airplane according to claim 10, wherein, in order to bring one of the front and rear ends of said ribs into abutment against said web of one of said first and second spars, a shim is provided in a gap defined between said flange of the other of said first and second spars and each of said ribs.

12. The wing structure for use with an airplane according to claim 11, wherein said shim is formed by a first positioning plate that includes a projection extending downwardly therefrom.

13. The wing structure for use with an airplane according to claim 10, wherein said ribs include a first flange extending along a length of the ribs in the cord direction of the ribs.

14. The wing structure for use with an airplane according to claim 9, wherein said first spar is a front spar and the second spar is an intermediate spar.

15. The wing structure for use with an airplane according to claim 9, wherein said first spar is an intermediate spar and the second spar is a rear spar.

16. The wing structure for use with an airplane according to claim 13, wherein said ribs include a second flange extending along a length of the ribs and being displaced relative to the first flange in the cord direction of the ribs.

17. A method of forming a wing structure for use with an airplane comprising the following steps:

positioning an upper skin on a surface;

forming a first C-shaped spar with a web, a pair of flanges connected to opposite ends of said web and a reinforcing partition wall connected to said web and said flanges;

forming a second I-shaped spar with a web, a pair of flanges connected to opposite ends of said web and a reinforcing partition wall connected to said web and said flanges;

positioning said first C-shaped spar on the skin;

positioning said second I-shaped spar on said skin at a position displaced a predetermined distance relative to the first C-shaped spar;

positioning a plurality of ribs extending in a cord direction, each rib being coupled between said first C-shaped spar and said second I-shaped spar extending in a span direction; and coupling front portions of said ribs to said reinforcing partition wall of said first C-shaped spar and coupling rear portions of said ribs to said reinforcing partition wall of said I-shaped second spar.

18. The method of forming a wing structure for use with an airplane according to claim 17, and including the step of bringing one of the front and rear ends of said ribs into abutment against said web of one of said first C-shaped spar and second I-shaped spar for positioning the ribs in the cord direction.

19. The method of forming a wing structure for use with an airplane according to claim 18, and including the step of providing a shim for bringing the one of the front and rear ends of said ribs into abutment against said web of one of said first C-shaped spar and said second I-shaped spar, said shim being positioned in a gap defined between said flange of the other of the first and second spars and each of said ribs.

* * * * *